US00RE42493E

(19) United States
(12) Reissued Patent
Tabarovsky et al.

(10) Patent Number: US RE42,493 E
(45) Date of Reissued Patent: Jun. 28, 2011

(54) APPARATUS AND METHOD FOR WELLBORE RESISTIVITY MEASUREMENTS IN OIL-BASED MUDS USING CAPACITIVE COUPLING

(75) Inventors: Leonty Abraham Tabarovsky, Cypress, TX (US); Albert Alexy, Katy, TX (US)

(73) Assignee: Baker Hughes Incorporated, Houston, TX (US)

(21) Appl. No.: 12/275,398

(22) Filed: Nov. 21, 2008

Related U.S. Patent Documents

Reissue of:
(64) Patent No.: 6,809,521
Issued: Oct. 26, 2004
Appl. No.: 10/347,019
Filed: Jan. 17, 2003

U.S. Applications:
(63) Continuation-in-part of application No. 09/836,980, filed on Apr. 18, 2001, now Pat. No. 6,714,014.

(60) Provisional application No. 60/353,245, filed on Feb. 1, 2002.

(51) Int. Cl.
*G01V 3/20* (2006.01)

(52) U.S. Cl. ..... 324/374; 324/375

(58) Field of Classification Search ..... 324/347, 324/354–356, 360, 366–370, 373–375; 175/40, 175/50; 166/248, 250.01, 254.2
See application file for complete search history.

(56) References Cited

U.S. PATENT DOCUMENTS

| | | | |
|---|---|---|---|
| 2,930,969 | A | 3/1960 | Baker |
| 3,365,658 | A | 1/1968 | Birdwell |
| 3,953,796 | A | 4/1976 | Keller |
| 3,973,181 | A | 8/1976 | Calvert |
| 4,122,387 | A | 10/1978 | Ajam et al. |
| 4,468,623 | A | 8/1984 | Gianzero et al. |
| 4,471,307 | A | 9/1984 | Bravenec |
| 5,036,283 | A | 7/1991 | Trouiller et al. |
| 5,502,686 | A | 3/1996 | Dory et al. |
| 5,703,773 | A | 12/1997 | Tabarovsky et al. |
| 6,173,793 | B1 | 1/2001 | Thompson et al. |
| 6,247,542 | B1 | 6/2001 | Kruspe et al. |
| 6,714,014 | B2 | 3/2004 | Evans et al. |
| 2003/0155925 | A1 | 8/2003 | Tabarovsky et al. |

FOREIGN PATENT DOCUMENTS

| | | |
|---|---|---|
| CA | 685727 | 5/1964 |

*Primary Examiner* — Bot L LeDynh
(74) *Attorney, Agent, or Firm* — Mossman Kumar & Tyler PC

(57) ABSTRACT

A resistivity device for downhole use with a nonconducting mud injects a current at a frequency sufficiently high to pass capacitively through the mud and a mud cake into the formation. The frequency is further selected so that the impedance due to the dielectric constant of the formation is small compared to the formation resistivity. Dual frequency measurements may be used to further minimize the effects of the mud and mud cake resistivity. When multiple frequency measurements are used, frequency focusing may be used to get an estimate of formation resistivity that is independent of near borehole effects.

14 Claims, 7 Drawing Sheets

APPARATUS AND METHOD FOR WELLBORE RESISTIVITY MEASUREMENTS IN OIL-BASED MUDS USING CAPACITIVE COUPLING

Matter enclosed in heavy brackets [ ] appears in the original patent but forms no part of this reissue specification; matter printed in italics indicates the additions made by reissue.

CROSS REFERENCES TO RELATED APPLICATIONS

This application is a continuation-in-part of U.S. patent application Ser. No. 09/836,980 filed on Apr. 18, 2001, now U.S. Pat. No. 6,714,014 and also claims priority from U.S. Provisional Application Ser. No. 60/353,245 filed on 1 Feb. 2002.

BACKGROUND OF THE INVENTION

1. Field of the Invention

This invention generally relates to explorations for hydrocarbons involving electrical investigations of a borehole penetrating an earth formation. More specifically, this invention relates to highly localized borehole investigations employing the introduction and measuring of individual survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present invention belongs to the first category.

There are several modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Pat. No. 685,727 to Mann et al. U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

U.S. Pat. No. 3,973,181 to Calvert teaches a method and apparatus for investigating earth formations traversed by the borehole containing an electrically nonconductive fluid in which a system of pad-mounted electrodes are arranged laterally around a well tool. A high frequency oscillator is coupled to the electrodes through a selectively variable capacitor. As the apparatus is passed through the borehole, the high frequency current produced by the oscillator capacitively couples the electrodes to the formation and provides a measure of the electrical conductivity or resistivity of the earth formation.

One major drawback with the use of contact devices injecting electrical currents into a wellbore arises when oil-based muds are used in drilling. Oil-based muds must be used when drilling through water soluble formations: an increasing number of present day exploration prospects lie beneath salt layers. Oil has a high electrical resistivity and even a thin film of oil can greatly reduce the effectiveness of conduction-based devices for determination of formation resistivities.

Co-pending U.S. patent application Ser. No. 09/836,980 of Evans et al. having the same assignee as the present application and the contents of which are fully incorporated herein by reference, teaches an apparatus and method based on the use of high frequency measurements for injecting measure currents into the formation. One embodiment of the device and method taught in the Evans '980 application uses a carrier frequency that is sufficiently high to capacitively couple the measure electrodes to the formation through the nonconducting mud. By modulating the carrier current at a frequency used in prior art resistivity imaging devices, it is possible to get measurements of formation resistivity with relatively minor changes in the hardware of prior art resistivity devices, the main modification being a modulator for producing the measure currents demodulator for demodulation of the measure currents.

It would be desirable to have a simple apparatus and method of determination of formation resistivity that may be used with oil-based muds that does not require complex modulation and demodulation circuitry. The present invention satisfies this need.

SUMMARY OF THE INVENTION

One embodiment of the present invention is an apparatus for use in a borehole for obtaining a resistivity parameter of an earth formation penetrated by the borehole, the borehole having a substantially nonconducting fluid (drilling mud) having a dielectric constant therein. The apparatus comprises a downhole tool including at least one measure electrode capacitively coupled to the earth formation through the nonconducting fluid. The at least one measure electrode conveys a measure current from a current source into the formation. The frequency of the measure current is selected to make an impedance caused by the dielectric constant of the drilling mud and mud cake to be substantially less than the resistivity of the drilling mud and mud cake. A measure signal is obtained that is indicative of the current in the at least one measure electrode, and/or the voltage of the measure electrode. A processor may be used for processing the measure signal and obtaining the resistivity parameter. The frequency is further selected so that the impedance caused by the dielectric constant of the formation is less than the formation resistivity.

The measure electrode may be carried on and insulated from a conducting pad. The pad is used for focusing the measure current into the formation. Optionally, an array of electrodes may be used for obtaining a resistivity image.

In an alternate embodiment of the invention, measurements may be carried out at two different frequencies. This give a result that further reduces the effects of the mud cake on the determined resistivity.

In yet another embodiment of the invention, measurements are made at a plurality of frequencies and multifrequency focusing is used to determine the formation resistivity.

BRIEF DESCRIPTION OF THE FIGURES

The present invention is best understood by reference to the following figures wherein like numbers refer to like components, and wherein.

DETAILED DESCRIPTION OF THE INVENTION

Figure 1:
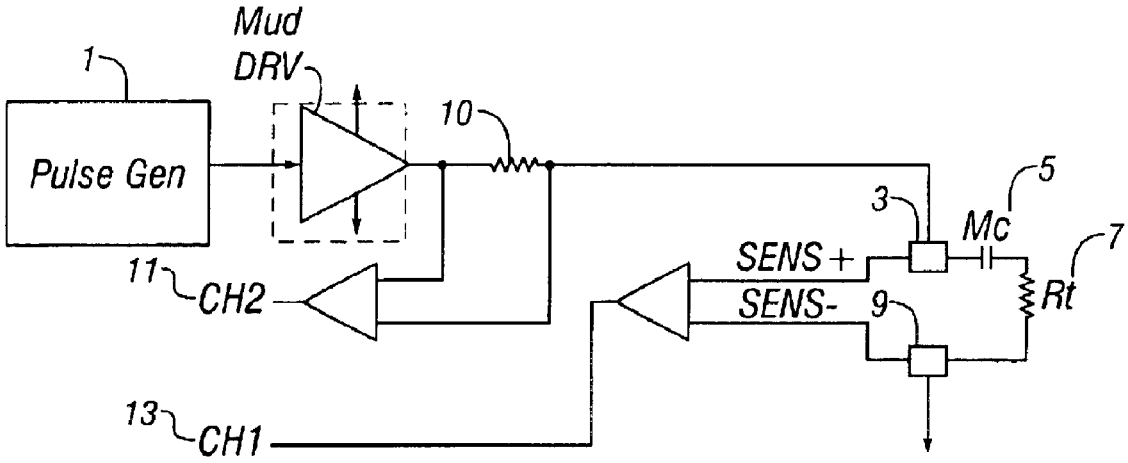
FIG. 1 is a circuit diagram representing a formation resistivity device according to the present invention.

FIG. 1 is a circuit diagram illustrating the methodology of formation resistivity measuring devices. A measure electrode depicted by 3 injects a measure current into a formation denoted by 7 having a resistivity $R_t$. This current is supplied by a current source 1. The current from the formation returns (not shown) through a return electrode (ground) denoted by 7. Typically, a voltage drop 11 across a resistor 10 in the circuit is used as an indication of the measure current. By measuring the voltage drop 13 between the measure electrode and the return electrode, information is derived about the impedance encountered by the current between the measure electrode and the ground.

Figure 2:
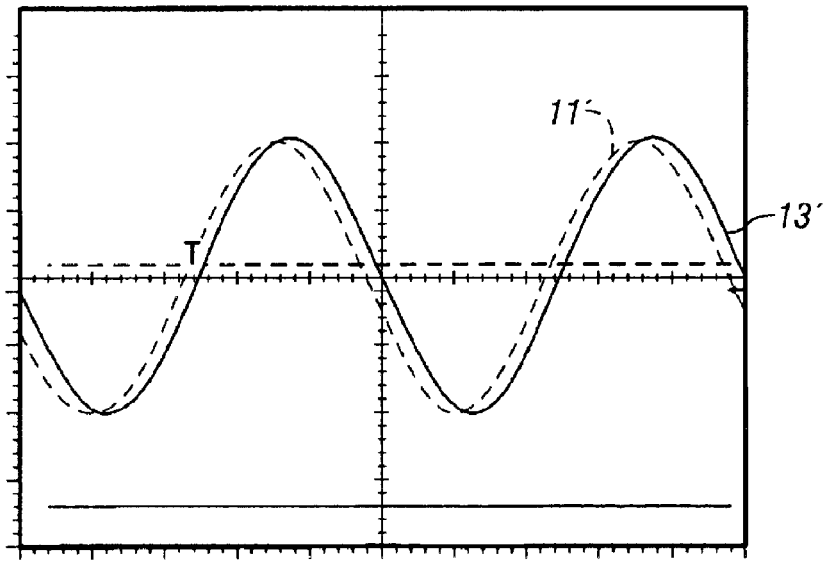
FIG. 2 shows a comparison of signals representative of the measure current and the voltage for the circuit of FIG. 1 for a 1 kHz sinusoidal excitation signal.

This impedance, as noted above, includes the desired formation resistivity $R_t$. In addition, there is also an impedance 5 between the measure electrode 3 and the formation 7. In water based (conductive) muds, this impedance is almost entirely resistive and is caused by the mud cake and any invasion of the borehole fluid into the formation. However, in oil-based (non conductive) muds, the impedance between the measure electrode 3 and the formation 7 is primarily capacitive, denoted by a capacitance $M_c$. This capacitance manifests itself in a phase shift between the measure current signal and the voltage drop from the measure electrode to ground. This is seen in FIG. 2 which shows a phase shift between the signals 11' and 13' for a sinusoidal current of 1 kHz. This frequency is typical of prior art formation resistivity measurement devices. The curves in FIG. 2 are normalized independently to emphasize the phase shift: in reality, there could be differences of several orders of magnitude between the two signals.

Figure 3:
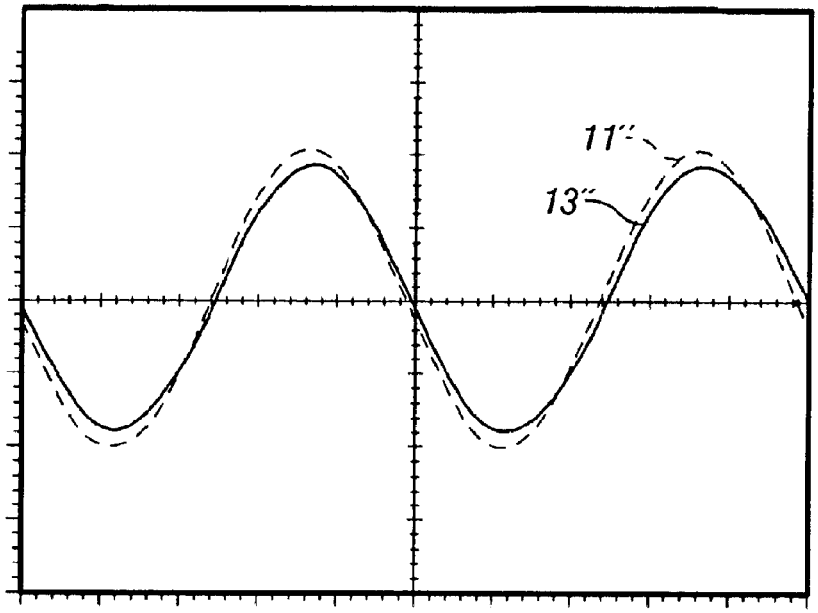
FIG. 3 shows a comparison of signals representative of the measure current and the voltage for the circuit of FIG. 1 for a 10 kHz sinusoidal excitation signal.
Figure 4:
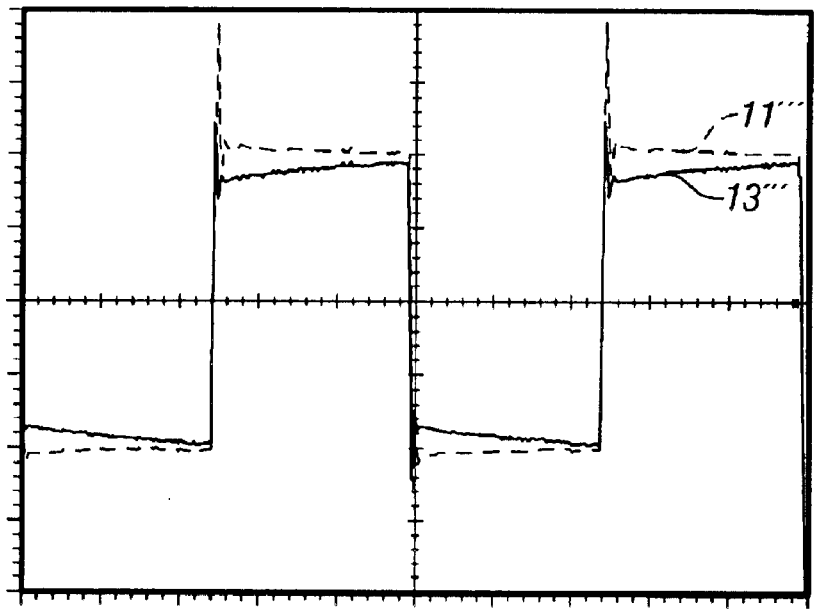
FIG. 4 shows a comparison of signals representative of the measure current and the voltage for the circuit of FIG. 1 for a 10 kHz square wave excitation.

Turning now to FIG. 3, the signals 11" and 13" for a sinusoidal current of 10 kHz are shown. The phase shift between the two signals is seen to be much smaller. This is due to the fact that at the higher frequency of 10 kHz, the effect of the capacitance is less than at 1 kHz. This suggests that by using higher frequencies, it would be possible to get signals indicative of the formation resistivity. This is confirmed in FIG. 4 which shows the signals 11''' and 13''' for a square wave excitation at 10 kHz. As can be seen, both the signals rise and fall almost instantaneously: this is due to the fact that a square wave contains a lot of high frequencies that are essentially unimpeded by the capacitance of the mud. The use of higher frequencies forms the basis for the present invention as described next.

Figure 5:
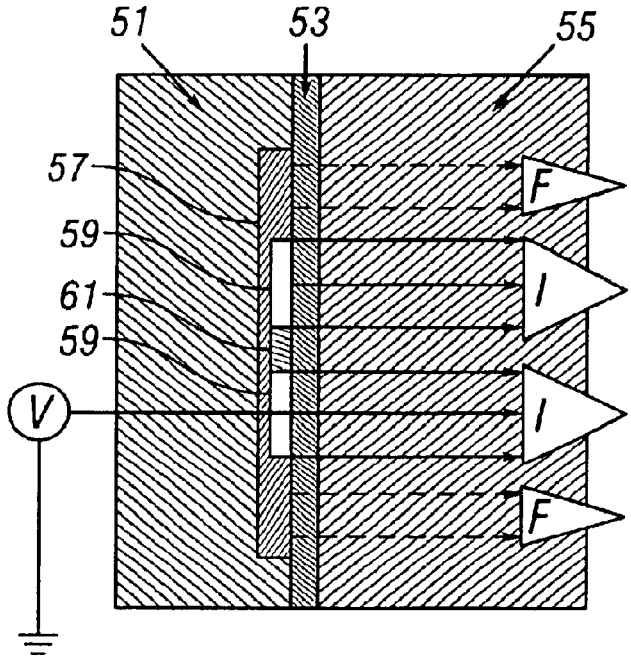
FIG. 5 (Prior Art)
FIG. 5 (Prior Art) shows a schematic illustration of a prior art imaging tool in a borehole.
Figure 6:
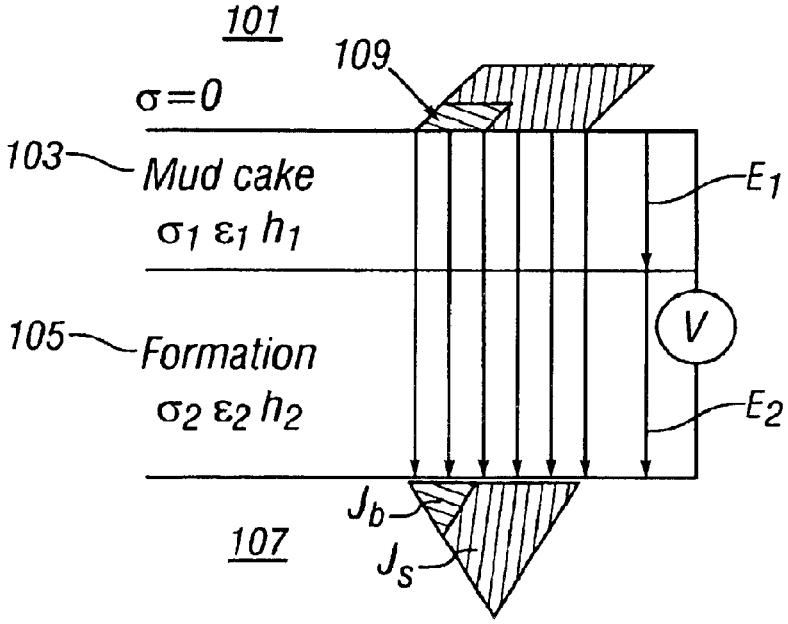
FIG. 6 illustrates a model used for deriving the impedance of an imaging tool.

FIG. 5 is a schematic illustration of a portion of a prior art imaging tool suitable for use with the method of the present invention. Shown is a borehole 51 that is filled with a borehole fluid (drilling mud). A mud-cake 53 is formed between the borehole fluid and the formation 55. The tool comprises one or more measure electrodes 59 carried on a conducting pad 57. In the illustration, only two electrodes are shown. As discussed in the Evans '980 application, the actual number of electrodes may be much larger and they may be arranged in an array. The electrodes 59 are separated from each other by insulator 61. For simplifying the illustration, additional insulation between the electrodes 59 and the pad 51 is not shown.

In prior art imaging tools, the pad functions as a guard electrode and is maintained at a potential related to the potential of the measure electrodes. As would be known to those versed in the art, due to the presence of the guard electrode and the current flowing into the formation therefrom, the current from the measure electrodes flows in current paths such as that shown by I and is prevented from diverging due to the focusing current F from the guard electrode. Optionally, additional focusing electrodes may be used (not shown) as discussed in the Evans '980 application. The current flowing from the measure electrode is related to the potential V and the impedance of the electrical circuit in which the measure currents flow.

When a device such as that shown in FIG. 5 is used with a water-based drilling mud, the impedance of the mud and the mudcake is relatively small compared to the impedance of the formation. As would be known to those versed in the art, at the frequencies used in prior art devices other than the Evans '980 application, the formation impedance is primarily resistive and from a knowledge of the potential V and the measure current I, the formation resistivity can be derived.

On the other hand, in oil-base mud, the measured impedance of individual measure electrodes severely depends on the mud cake parameters. In addition, an oil film on the pad surface may completely eliminate the electrical contact between pad and formation.

The size of a measure electrode is associated with the tool spatial resolution. Usually, the measure electrode radius is in the range of 1 to 2 mm that creates a very large ground resistance. For example, a 2 mm measure electrode on a typical pad device has the ground resistance of 10,000 Ω in a 1 Ω-m formation or 10 M Ω in a 1,000 Ω-m formation. This illustrates the technical challenge of producing a high definition image in a resistive environment There are several possible ways to overcome the physical limitation of DC imaging in oil-base mud. One approach that has been used is to change composition of oil-base mud to increase the mud cake conductivity. The present invention and the invention of the Evans '980 application rely on increasing the frequency to produce capacitive coupling between pad and formation.

Turning now to FIG. 8, the impedance of the measure electrode is derived. We consider a model consisting of two conductive layers 103, 105 enclosed between an insulating half-space at the top 101 and a perfect conductor at the bottom 107. From the upper boundary, a uniform current is injected with the surface density, $J_s$. A measure electrode of any shape may be studied by cutting out an appropriate area 109 from the injection plane. The upper half-space 101 represents a borehole filled with oil-base mud. The conductor 107 at the bottom is a current sink. In reality, at a certain distance, depending on the focusing conditions, current lines diverge. This provides a finite value for the measure electrode's K-factor. To simplify modeling, we introduce a parallel current flow. We can change the K-factor by placing the current return (perfect conductor) at different distances from the borehole. It is well known that the K-factor of a cylindrical volume with a cross section, S, and length, L, is defined by the following equation:

$$K = \int_L \frac{dl}{S(l)} \tag{1}$$

where S(l) is the cross-sectional area at a distance l along the current path.

The mud cake 103 is characterized by a conductivity $\sigma_1$, permittivity $\epsilon_1$ and thickness $h_1$. Similarly, the formation 105 is characterized by a conductivity $\sigma_2$, permittivity $\epsilon_2$, and thickness $h_2$. The complex conductivities of the mudcake and formation are given by $$v_1=\sigma_1+i\omega\epsilon_1 \tag{2}$$

and $$v_2=\sigma_2+i\omega\epsilon_2 \tag{3}$$

respectively, where $\omega=2\pi f$(f being the frequency).

Denoting by $E_1$ and $E_2$ the electric field in the mud cake and the formation and by V the potential difference between the measure electrode and the current return (ground in FIG. 1), the following equations result:

$J_B=v_1E_1S$ (current injected through the electrode)

$v_1E_1=v_2E_2$ (continuity of current) and $E_1h_1+E_2h_2=V$ (overall voltage).

This gives $$V = \frac{J_b}{S}\left(\frac{h_1}{v_1} + \frac{h_2}{v_2}\right) \tag{4}$$

Introducing the electrode impedance, we finally obtain:

$$Z = \frac{V}{J_b} = \frac{1}{S}\left(\frac{h_1}{v_1} + \frac{h_2}{v_2}\right) = \frac{1}{S}\left(\frac{h_1}{\sigma_1 + i\omega\varepsilon_1} + \frac{h_2}{\sigma_2 + i\omega\varepsilon_2}\right) \tag{5}$$

The first term on the right hand side in eq. (5) represents the impedance of the mud cake while the second term represents the impedance of the formation. At low frequencies ($\omega\rightarrow 0$), the measured impedance depends primarily on the mud cake conductivity and the formation conductivity, i.e., it does not depend upon the dielectric constant of the mud cake and the formation. However, if the mud is oil based (mud cake is resistive), then the measured impedance may become so large that it would be virtually impossible to inject any current into the formation.

Eq. (5) indicates that we can reduce the mud cake impedance by increasing the frequency ω. This can be done by selecting the frequency such that:

$$\omega\epsilon_1 \gg \sigma_1 \tag{6}$$

While reducing the mud cake impedance, we must also maintain the frequency such that the second term in eq. (5) depends mostly on the formation conductivity $\sigma_2$. This leads to the condition:

$$\omega\epsilon_2 \ll \sigma_2 \tag{7}$$

Combining eqs. (6) and (7) gives the results:

$$\frac{\sigma_1}{\varepsilon_1} \ll \omega \ll \frac{\sigma_2}{\varepsilon_2}. \tag{8}$$

In an oil-based mud, both inequalities in eq. (6) must be satisfied because $\sigma_1 \ll_2$ Under these conditions, eq. (5) may be written in the form:

$$\begin{aligned} Z &\approx \frac{1}{S}\left[\frac{h_1}{i\omega\varepsilon_1}\left(1-\frac{\sigma_1}{i\omega\varepsilon_1}\right)+\frac{h_2}{\sigma_2}\left(1-\frac{i\omega\varepsilon_2}{\sigma_2}\right)\right] \\ &= \frac{1}{S}\left[\left(\frac{h_2}{\sigma_2}+\frac{h_1\sigma_1}{(\omega\varepsilon_1)^2}\right)-i\left(\frac{h_1}{\omega\varepsilon_1}+\frac{h_2\omega\varepsilon_2}{\sigma_2^2}\right)\right] \end{aligned} \tag{9}$$

Eq. (9) can be written in the form:

$$Z=\Re(Z)+\Im(Z) \tag{10}$$

where $\Re(Z)$ and $\Im(Z)$ are the real and imaginary (inphase and quadrature) parts of the impedance given by:

$$\Re(Z) = \frac{1}{S}\left(\frac{h_2}{\sigma_2}+\frac{\sigma_1 h_1}{(\omega\varepsilon_1)^2}\right) \tag{11}$$

and $$\Im(Z) = -\frac{1}{S}\left(\frac{h_1}{\omega\varepsilon_1}+\frac{h_2\omega\varepsilon_2}{\sigma_2^2}\right). \tag{12}$$

It should be noted that Calvert only recognizes the necessity for satisfying eq. (6) and does not recognize problems caused if the inequality given by eq. (7) is not satified.

The following points may be noted about eq. (11) (the real part of the impedance):

1. The first term depends on formation conductivity and does not include dielectric permittivity. It exactly represents the resistivity reading in the absence of mud cake.
2. The second term contains only mud cake properties. Importantly, it is inversely proportional to the second power of the frequency.
3. The second term may be eliminated in two different ways. The first way is to use a high frequency. The second way to eliminate the second term is by combining measurements at two different frequencies. This is given by the following equation:

$$Z = \frac{\omega_1^2\Re Z(\omega_1)-\omega_2^2\Re Z(\omega_2)}{\omega_1^2-\omega_2^2} = \frac{1}{S}\frac{h_2}{\sigma_2}. \tag{13}$$

Turning now to eq. (12), the quadrature (out of phase) component of the impedance, the following points may be noted.

1. With the frequency increase, the formation contribution (the second term) becomes more significant.
2. While dominating, the formation signal retains dependence on the formation dielectric constant. This introduces undesirable uncertainty in the process of interpretation.
3. Due to eq. (8) the out of phase component is typically small compared to the in phase component.

The points noted above are brought out in FIGS. 7-8 which show exact relationships derived from eq. (5). Calculations were done for an electrode radius of 2 mm, K factor of 12,000 $m^{-1}$, and a relative dielectric constant of 10 for both the mud and the formation. The relative dielectric constant is the ratio of the permittivity of a medium to that of free space.

Figure 7A:
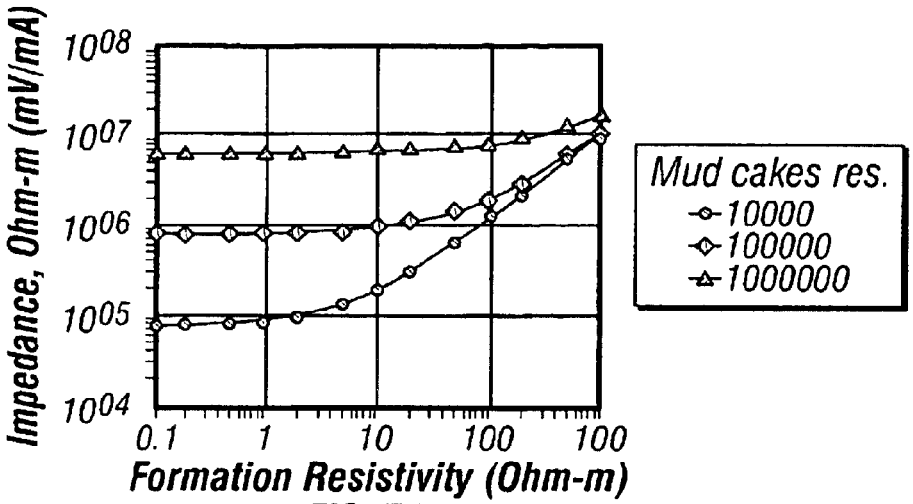
FIGS. 7a-7f illustrate the impedance of a measure electrode at a frequency of 1 kHz.

Referring now to FIG. 7a, the abscissa is the formation resistivity in Ωm and the ordinate is the $\Re(Z)$. Values are plotted for a frequency of 1 kHz. Three curves are shown for mud cake resistivities of 10 kΩm, 100 kΩm and 1000 kΩm and a mud cake thickness of 0.1 mm. As can be seen, the $\Re(Z)$ depends not only on the formation resistivity but also on the resistivity of the mud cake.

Figure 7B:
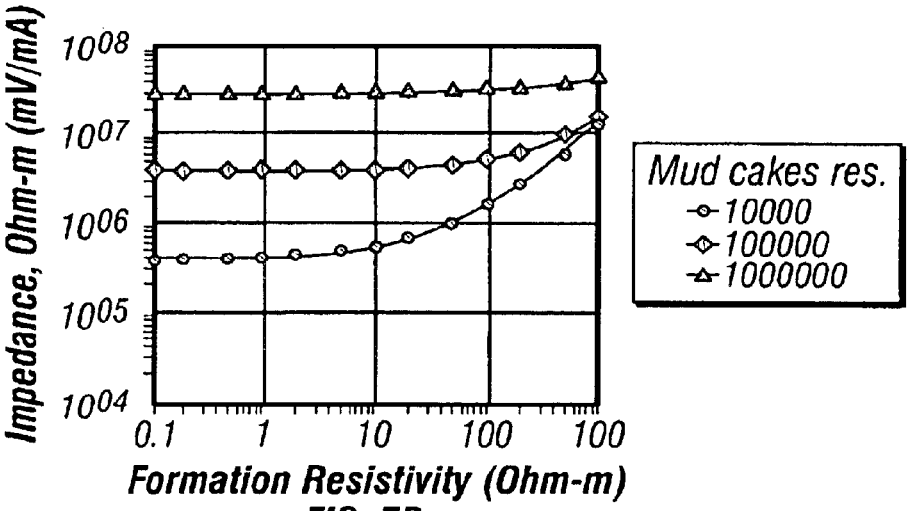
Figure 7C:
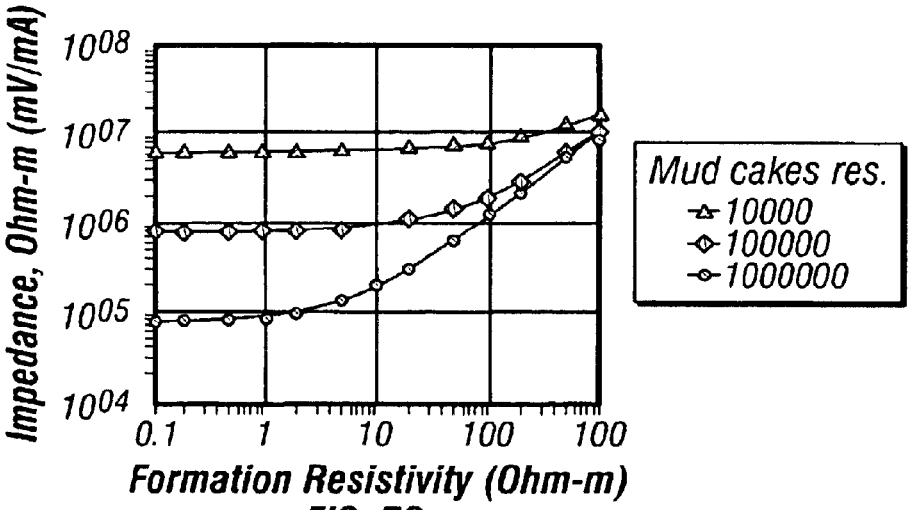

FIG. 7b is similar to FIG. 7a except that the mud cake thickness is 0.5 mm. Differences between FIG. 7b and FIG. 7a show that the $\Re(Z)$ is also dependent upon the mud cake thickness. FIG. 7c is a plot of the absolute value of the electrode impedance for a mud cake thickness of 0.1 mm.

Figure 7D:
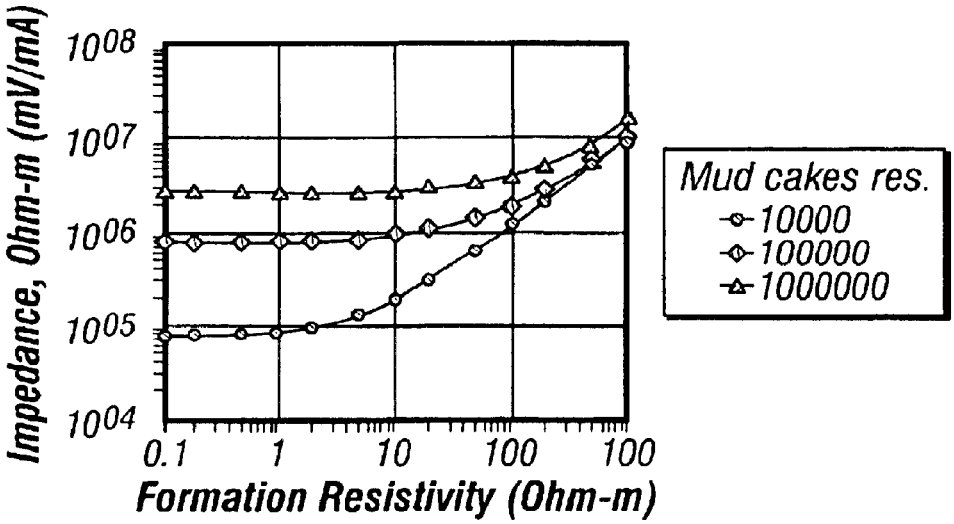
Figure 7E:
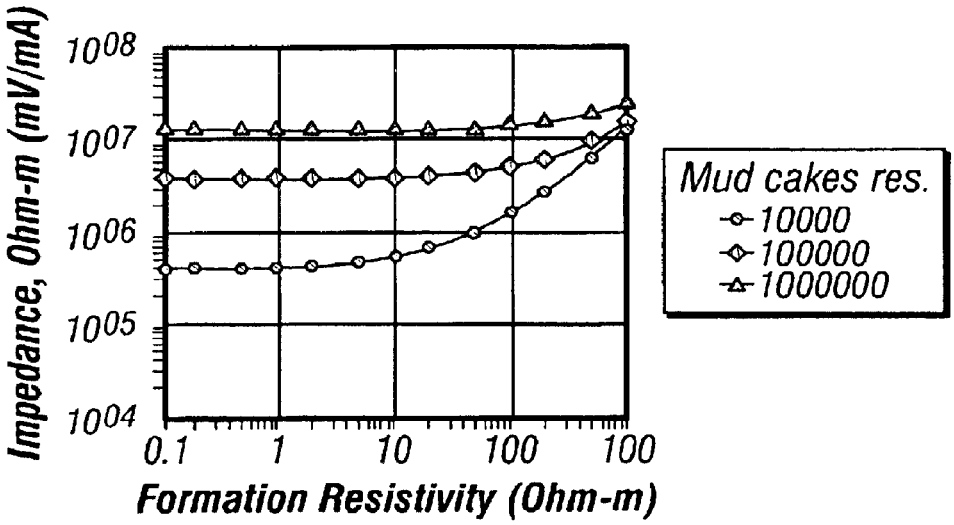
Figure 7F:
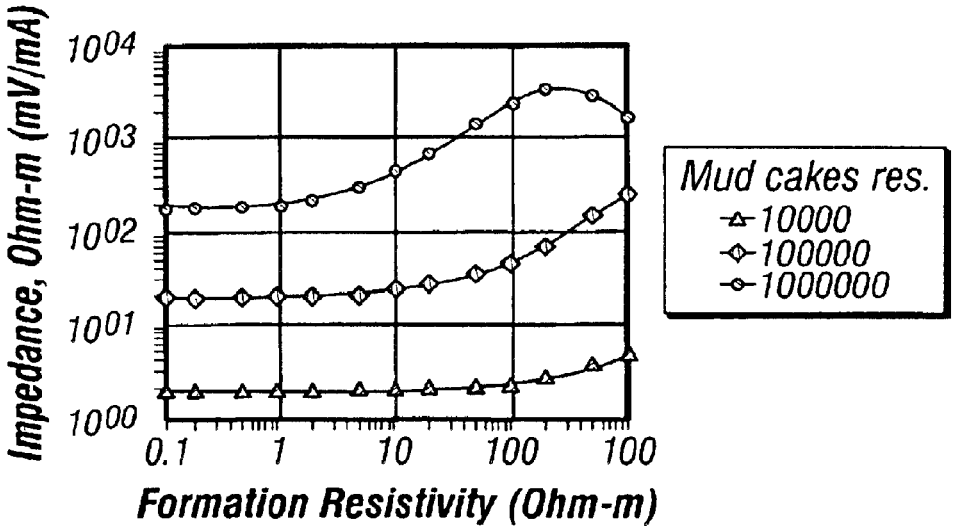
Figure 8A:
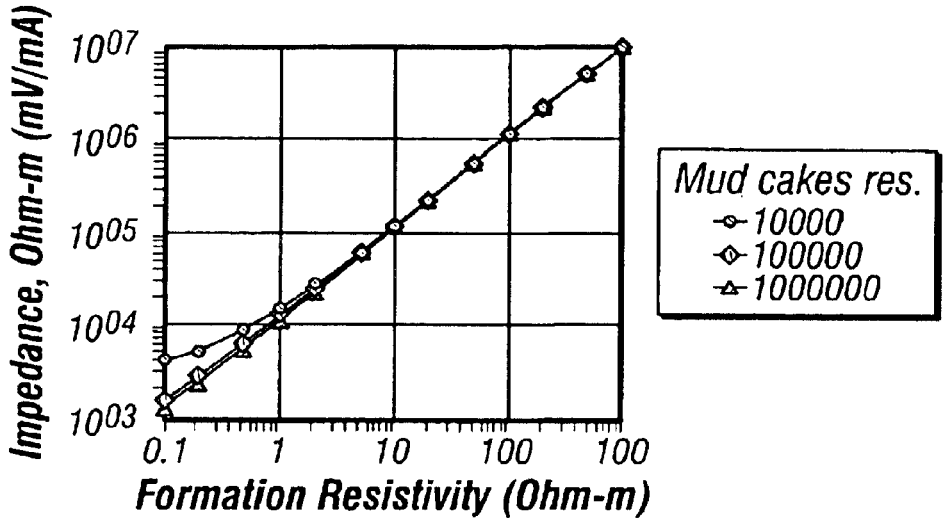
FIGS. 8a-8f illustrate the impedance of a measure electrode at a frequency of 10 kHz.
Figure 8B:
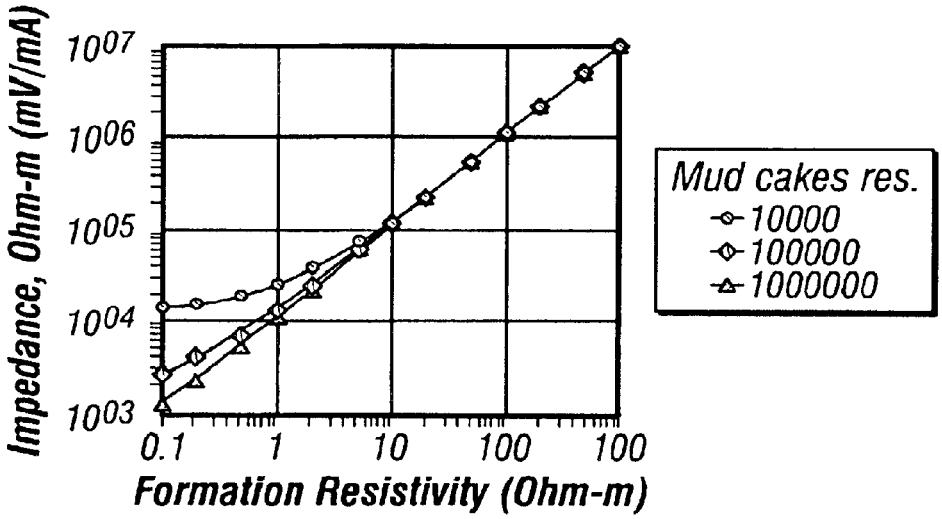
Figure 8C:
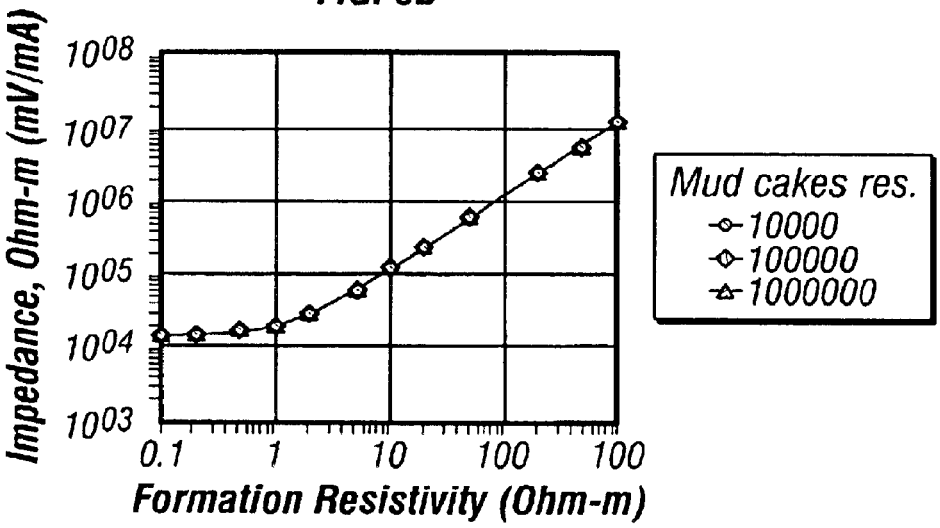
Figure 8D:
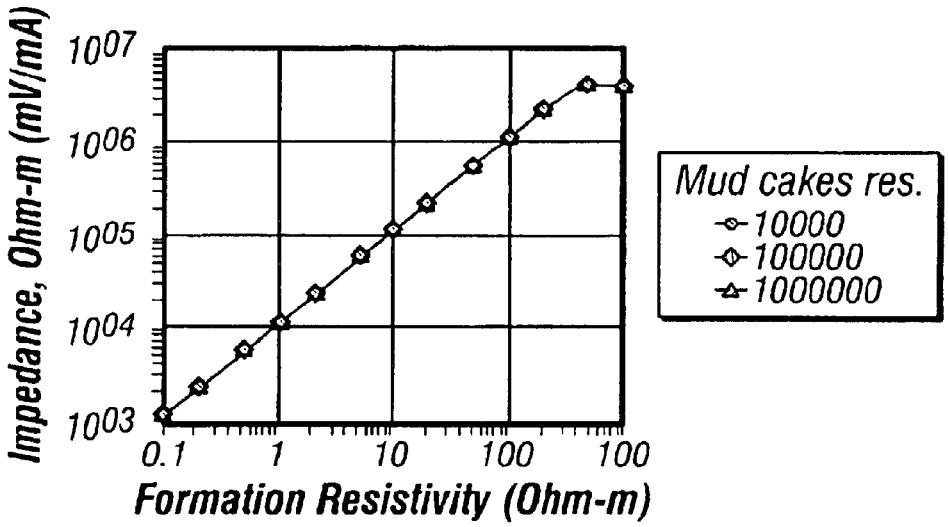
Figure 8E:
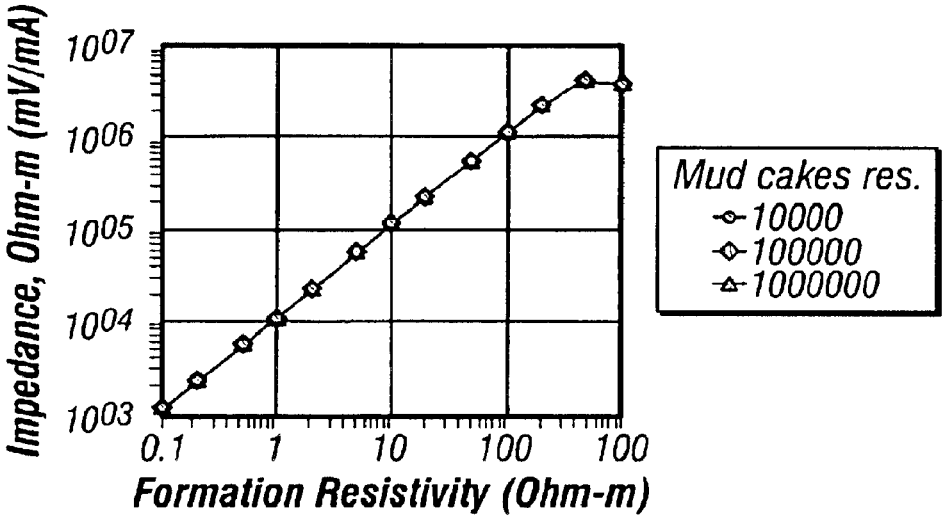
Figure 8F:
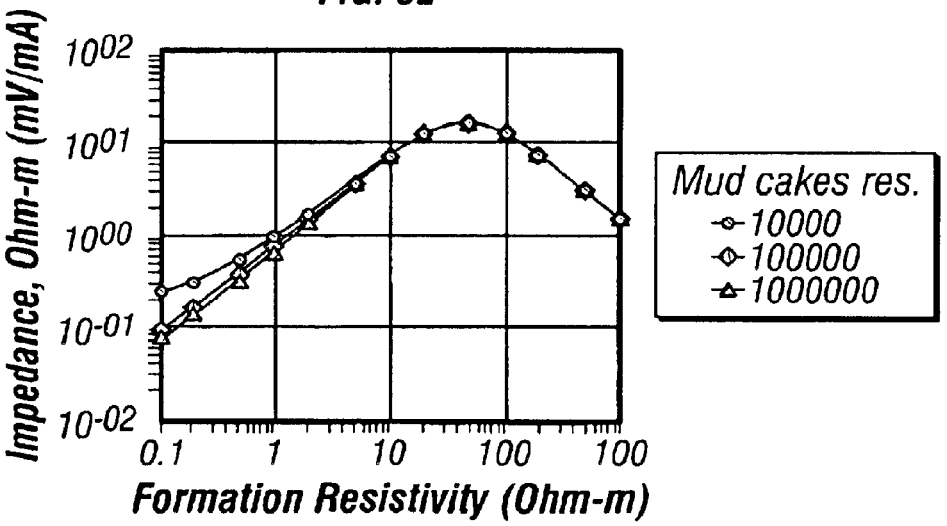

Turning now to FIG. 7d, a plot of the dual frequency impedance determined by eq. (13) for a mud cake thickness of 0.1 mm is shown. The dual frequency values were obtained using measurements at 1 kHz and 2 kHz respectively. FIG. 7e shows the results of dual frequency measurements for a mud cake thickness of 0.2 mm. Finally, FIG. 7f shows a plot of the ratio of $\Re(Z)$ to $\Im(Z)$.

In summary, FIGS. 7a-7f explain why measurements made by conventional resistivity imaging tools do not work with oil based muds.

Turning now to FIGS. 8a-8f, a completely different picture emerges. The figures are similar to FIGS. 7a-7f with the significant difference that the operating frequency is now 1 MHz (compared to 1 kHz in FIGS. 7a-7f). For a relatively thin mud cake (FIG. 8a), the $\Re(Z)$ is primarily dependent upon the formation resistivity except for extremely conductive formations where some dependence upon the mud cake resistivity is noted. The effect is more noticeable for a thicker mud cake (0.5 mm in FIG. 8b). The amplitude of the impedance (FIG. 8c) shows little variation with mud cake resistivity but does exhibit a nonlinear dependence upon the formation resistivity. The dual frequency measurements (FIGS. 8d, 8e) show that the measured impedance is substantially independent of mud cake thickness and resistivity and further exhibits the desirable property of being linearly related to the formation resistivity.

The dual frequency solution given by eq. (13) is a special case of multifrequency focusing. In an alternate embodiment of the invention, measurements are made at a plurality of frequencies $\omega_1, \omega_2, \omega_3, \ldots \omega_m$. As disclosed in U.S. Pat. No. 5,703,773 to Tabarovsky et al., the contents of which are fully incorporated herein by reference, the response at multiple frequencies may be approximated by a Taylor series expansion of the form:

$$\begin{bmatrix} \sigma_a(\omega_1) \\ \sigma_a(\omega_2) \\ \vdots \\ \sigma_a(\omega_{m-1}) \\ \sigma_a(\omega_m) \end{bmatrix} = \begin{bmatrix} 1 & \omega_1^{1/2} & \omega_1^{3/2} & \cdots & \omega_1^{n/2} \\ 1 & \omega_2^{1/2} & \omega_1^{3/2} & \cdots & \omega_2^{n/2} \\ \vdots & \vdots & \vdots & \iddots & \vdots \\ 1 & \omega_{m-1}^{1/2} & \omega_{m-1}^{3/2} & \cdots & \omega_{m-1}^{n/2} \\ 1 & \omega_m^{1/2} & \omega_m^{3/2} & \cdots & \omega_m^{n/2} \end{bmatrix} \begin{bmatrix} s_0 \\ s_{1/2} \\ \vdots \\ s_{(n-1)/2} \\ s_{n/2} \end{bmatrix}. \tag{14}$$

In a preferred embodiment of the invention of the number m of frequencies ω is ten. Using the measurements at the m frequencies, the quantities $s_0$, $s_{1/2}$, $s_{3/2}$ are determined. In eq.(12), n is the number of terms in the Taylor series expansion. This can be any number less than or equal to m. The coefficient $S_{3/2}$ of the $\omega^{3/2}$ term (ω being the square of k, the wave number) is generated by the primary field and is relatively unaffected by any inhomogeneities in the medium surround the logging instrument, i.e., it is responsive primarily to the formation parameters and not to the borehole and invasion zone. In fact, the coefficient $s_{3/2}$ of the $\omega^{3/2}$ term is responsive to the formation parameters as though there were no borehole in the formation. This frequency focusing method has been shown to give reliably consistent results even when there is a significant invasion of the formation by borehole fluids. In one embodiment of the invention, a processor controls the signal generator to provide a measure current at a plurality of frequencies. The processor then performs a frequency focusing of the apparent conductivity at the plurality of frequencies to obtain the coefficients $s_{3/2}$. This is then used as an estimate of the formation conductivity.

The invention has further been described by reference to logging tools that are intended to be conveyed on a wireline. However, the method of the present invention may also be used with measurement-while-drilling (MWD) tools, or logging while drilling (LWD) tools, either of which may be conveyed on a drillstring or on coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for use in a borehole for obtaining a resistivity parameter of an earth formation penetrated by the borehole, the borehole having a substantially nonconducting fluid having a dielectric constant therein, the apparatus comprising:

(a) a downhole tool including at least one measure electrode coupled to the earth formation through said nonconducting fluid, said at least one measure electrode conveying a measure current from a source thereof into the formation, said measure current having a frequency selected to make an impedance caused by said dielectric constant to be substantially less than a resistivity of said nonconductive fluid, said frequency being further selected to make an impedance caused by a dielectric constant of said formation to be substantially [less] *greater* than a resistivity of said formation;

(b) a device responsive to least one of [(I)]

(*i*) the current in the at least one measure electrode, and, (ii) a voltage of the at least one measure electrode for producing a measure signal representative of the resistivity parameter.

2. A method of obtaining a resistivity parameter of an earth formation penetrated by a borehole having a substantially nonconducting fluid therein, the method comprising:

(a) conveying a measure current through a measure electrode into the earth formation by capacitive coupling through the nonconducting fluid, said measure current having a first frequency selected to make an impedance caused by said dielectric constant to be substantially less than a resistivity of said nonconductive fluid, and an impedance caused by a dielectric constant of said formation to be substantially [less] *greater* than a resistivity of said formation; and (b) determining at least one of [(I)]

(*i*) the current at the at least one measure electrode, and, (ii) a voltage of the at least one measure electrode for producing a measure signal representative of the resistivity parameter.

3. A method of obtaining a resistivity parameter of an earth formation penetrated by a borehole having a substantially nonconducting fluid therein, the method comprising:

(a) conveying a measure current through a measure electrode into the earth formation by capacitive coupling through the nonconducting fluid, said measure current having a first frequency selected to make an impedance caused by said dielectric constant to be substantially less than a resistivity of said nonconductive fluid;

(b) repeating (a) at a second frequency, (c) determining at least one of [(I)]

(*i*) the current at the at least one measure electrode, and, (ii) a voltage of the at least one measure electrode for producing a measure signal representative of the resistivity parameter at said first frequency and said second frequency; and (d) determining from said measure signals at said first and second frequencies said resistivity parameter.

4. The method of claim 3 further comprising using a conducting pad for maintaining focusing of said measure current into the formation.

5. The method of claim 3 wherein the at least one measure electrode comprises an array of measure electrodes, the method further comprising obtaining a resistivity image of the formation.

6. The method of claim 3 further comprising selecting said first frequency for making an impedance caused by a dielectric constant of said formation to be substantially [less] *greater* than a resistivity of said formation.

7. The method of claim 3 further comprising using a processor for determining from said measure signal said resistivity parameter of the formation.

8. The method of claim 3 further comprising using at least one of [(I)] (*i*) a wireline, and, (ii) a drilling tubular, for conveying said at least one measure electrode into the borehole.

9. The method of claim 3 wherein determining said resistivity parameter further comprises using a processor.

10. The method of claim 9 wherein said processor is at a location selected from (I) a downhole location, and, (II) a surface location.

11. A method of obtaining a resistivity parameter of an earth formation penetrated by a borehole having a substantially nonconducting fluid having a dielectric constant therein, the method comprising:

(a) conveying a measure current through a measure electrode into the earth formation by capacitive coupling through the nonconducting fluid at a plurality of frequencies, each of said plurality of frequencies selected to make an impedance caused by said dielectric constant to be substantially less than a resistivity of said nonconductive fluid;

(b) determining at least one of [(I)] (*i*) the current at the at least one measure electrode, and, (ii) a voltage of the at least one measure electrode for producing a measure signal representative of the resistivity parameter at each of said plurality of frequencies; and (c) frequency focusing apparent conductivities derived from said measure signal at each of said plurality of frequencies and obtaining said resistivity parameter.

12. The method of claim 11 further comprising selecting said frequency for making an impedance caused by a dielectric constant of the formation to be substantially [less] *greater* than a resistivity of said earth formation.

13. The method of claim 11 wherein said frequency focusing further comprises representing each measured signal at said plurality of frequencies in a Taylor Series expansion.

14. The method of claim 11 wherein said resistivity parameter is related to a coefficient of an $\omega^{3/2}$ term in said Taylor series expansion.

* * * * *